US008250581B1

(12) United States Patent
Blanding

(10) Patent No.: US 8,250,581 B1
(45) Date of Patent: Aug. 21, 2012

(54) ALLOCATING COMPUTER RESOURCES TO CANDIDATE RECIPIENT COMPUTER WORKLOADS ACCORDING TO EXPECTED MARGINAL UTILITIES

(75) Inventor: William H. Blanding, Bow, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1332 days.

(21) Appl. No.: 11/926,087

(22) Filed: Oct. 28, 2007

(51) Int. Cl.
*G06F 9/46* (2006.01)
*G06F 15/173* (2006.01)

(52) U.S. Cl. .................. 718/104; 718/103; 709/226

(58) Field of Classification Search .................. None
See application file for complete search history.

(56) References Cited

U.S. PATENT DOCUMENTS

| 5,745,652 | A |   | 4/1998  | Bigus |            |
|-----------|---|---|---------|-------|------------|
| 6,016,503 | A | * | 1/2000  | Overby et al. | 718/104 |
| 6,070,052 | A | * | 5/2000  | Ogasawara et al. | 455/13.1 |
| 7,103,806 | B1| * | 9/2006  | Horvitz | 714/43 |
| 7,433,856 | B2| * | 10/2008 | Wu et al. | 706/47 |
| 7,769,628 | B2| * | 8/2010  | Mathews et al. | 705/7.31 |
| 8,037,475 | B1| * | 10/2011 | Jackson | 718/104 |
| 2003/0084030 | A1 | * | 5/2003 | Day et al. | 707/3 |
| 2005/0080979 | A1 | * | 4/2005 | Wu et al. | 711/1 |
| 2005/0132378 | A1 | * | 6/2005 | Horvitz et al. | 718/104 |
| 2005/0172291 | A1 | * | 8/2005 | Das et al. | 718/104 |
| 2005/0183084 | A1 | * | 8/2005 | Cuomo et al. | 718/100 |
| 2005/0240668 | A1 | * | 10/2005 | Rolia et al. | 709/223 |
| 2005/0256946 | A1 | * | 11/2005 | Childress et al. | 709/223 |
| 2006/0010450 | A1 | * | 1/2006 | Culter | 718/104 |
| 2006/0020944 | A1 | * | 1/2006 | King et al. | 718/104 |
| 2006/0101464 | A1 | * | 5/2006 | Dohrmann | 718/100 |
| 2006/0288346 | A1 | * | 12/2006 | Santos et al. | 718/102 |
| 2008/0109343 | A1 | * | 5/2008 | Robinson et al. | 705/37 |
| 2008/0172673 | A1 | * | 7/2008 | Naik | 718/104 |
| 2009/0037570 | A1 | * | 2/2009 | Yu et al. | 709/224 |

* cited by examiner

*Primary Examiner* — Meng An
*Assistant Examiner* — Tammy Lee

(57) ABSTRACT

The present invention provides for allocating computer resources to computer workloads at least in part as a function of expected marginal utilities of candidate recipient workloads.

11 Claims, 4 Drawing Sheets

US 8,250,581 B1

ALLOCATING COMPUTER RESOURCES TO CANDIDATE RECIPIENT COMPUTER WORKLOADS ACCORDING TO EXPECTED MARGINAL UTILITIES

BACKGROUND OF THE INVENTION

A major objective of the present invention is to enhance the ability of an automated workload manager to dynamically allocate resources to workloads to maximize a selected measure of desirability. The computing resources required by software workloads can vary considerably over time. Providing sufficient resources to each workload full time to handle occasional peaks can be wasteful. Dynamic workload management shifts computing resources among workloads on an as-needed basis; as a result, workload requirements can be met with fewer total resources and, thus, at lower cost.

Workload management software automatically allocates resources in accordance with "management policies" designed to optimize the value of the computer system to the user. The policies can provide a great deal of flexibility for a user to determine how resources are to be allocated and what factors should be taken into account. For example, a simple utilization-based policy calls for shifting resources from workloads with lower percentage utilizations of a resource to workloads with higher percentage utilizations.

Workload management requires predicting for an upcoming allocation period an amount of a computing resource required to meet some target performance level for a workload. Resources are then allocated at least in part as a function of demand levels for the workloads predicted at least in part based on resource consumption histories. However, as the future is uncertain, future demand can be better represented by a range of demand levels with different probabilities of occurring, in other words, by a probability distribution of demand levels. Workload management schemes that use only a single predicted demand level effectively discard distribution data that might otherwise be useful in determining an optimal allocation of resources to workloads.

Currently pending U.S. patent application Ser. No. 11/752, 231 to Blanding, discloses a "multi-prediction" workload management method that takes advantage of some of the additional information available in a probability distribution. This method provides for the generation of multiple resource requests with reduced priorities as a means of incorporating uncertainty concerning workload resource demands into the allocation process. However, the present invention offers, at least in some cases, a more effective approach to incorporating demand-level probability distribution information in resource allocation.

Herein, related art is described to facilitate understanding of the invention. Related art labeled "prior art" is admitted prior art; related art not labeled "prior art" is not admitted prior art.

BRIEF DESCRIPTION OF THE DRAWINGS

The figures depict implementations/embodiments of the invention and not the invention itself.

DETAILED DESCRIPTION

The present invention provides, for each workload, a workload utility function that specifies a utility value for each possible combination of resource allocation level and demand level. For each workload, its predicted demand probability distribution can be used to derive an expected utility function that allows utility to be determined for each possible resource allocation amount for that workload. The difference between the utility for the current allocation level and the allocation level after the next resource unit is allocated to that workload is the expected marginal utility. Workloads can be prioritized on the basis of their expected marginal utilities for resource allocation purposes. The allocation process can be tailored to user needs through selection of the workload utility function. Note: that while the workload utility function can be two-dimensional, the expected utility function and marginal utility function can be one-dimensional since the latter two are for a given probability distribution of a demand-level parameter that serves as an independent variable for the workload utility function. That is, the expected utility function and marginal utility functions are computed from the workload utility function and a function expressing the likelihood of various levels of resource demand by the workload.

Figure 1:
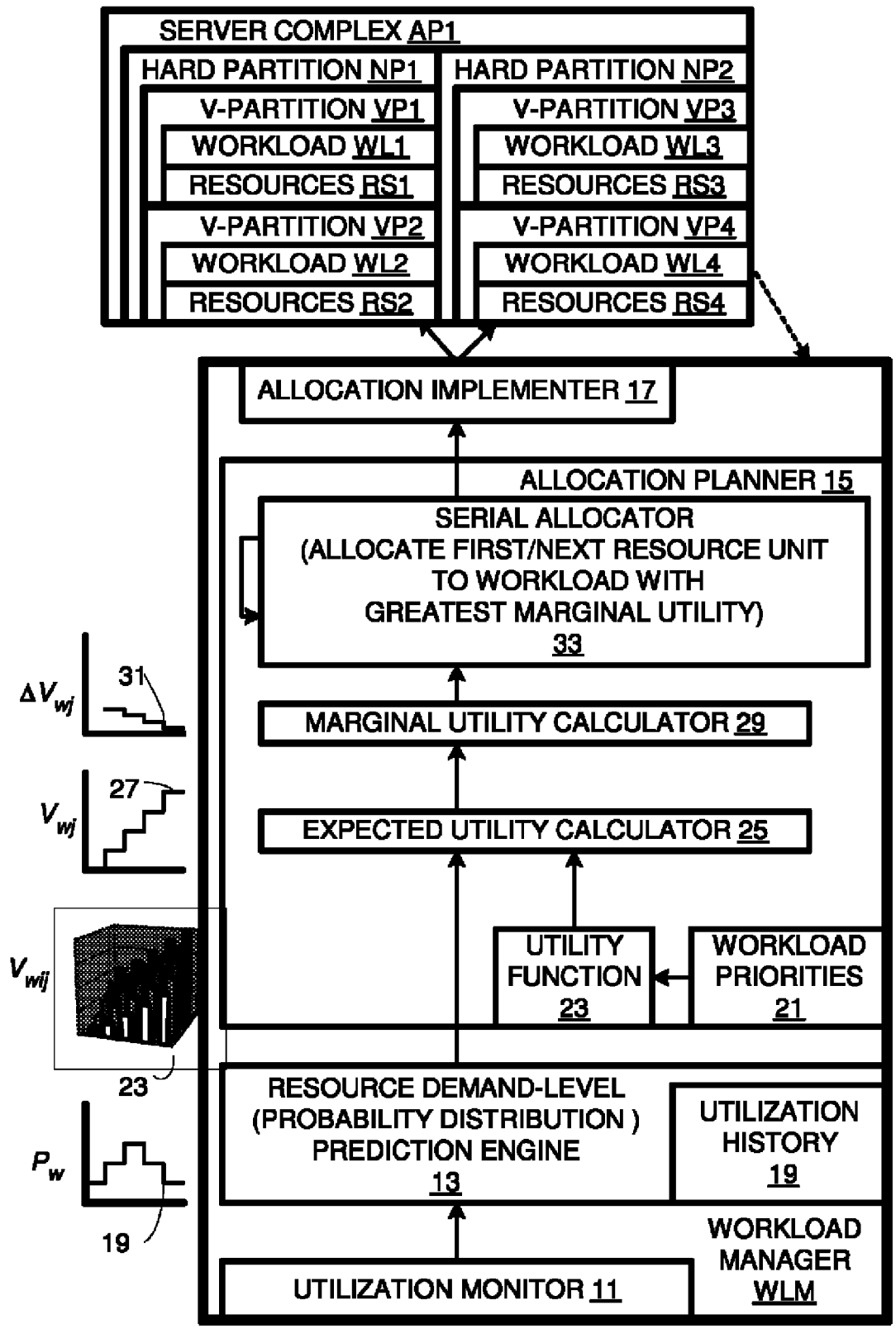
FIG. 1 is a computer system in accordance with an embodiment of the present invention. Schematic versions of graphs of functions associated with the system are shown along the left side.

As shown in FIG. 1, a server complex AP1 is divided into two hard partitions NP1 and NP2. Hard partition NP1 is divided into virtual partitions VP1 and VP2, while hard partition NP2 is divided into virtual partitions VP3 and VP4. Virtual partitions VP1-VP4 have respective resources RS1-RS4 and respective workloads WL1-WL4. Server complex AP1 defines a shared resource domain in which the resource units that constitute resources RS1-RS4 can be reallocated among hard partitions NP1 and NP2, virtual partitions VP1-VP4, and thus among workloads WL1-WL4.

Each workload WL1-WL4 includes an operating system instance, an application program, and a workload management agent. Workload WL4 includes a workload manager WLM. Workload manager WLM includes a workload utilization monitor 11, a resource demand-level prediction engine 13, an allocation planner 15, and an allocation implementer 17. Resources RS1-RS4 include processors, communications devices, and computer-readable media for storing computer programs and data. It will be appreciated that FIG. 1 is an illustrative example of a workload management system to which the invention can be applied, selected from many possible arrangements and combinations of operating system and sub-OS resource containers, workload management agents and computing resources.

Utilization monitor 11 communicates with the workload management agents for workloads WL1-WL4 to gather utilization data for each workload for the present allocation period. The utilization data is transmitted to prediction engine 13, which compiles the present data with historical data in utilization history 19. The current and historical utilization data for each workload are used to generate probability distributions 21 for resource demand for the workload. Each probability distribution 19 indicates, for a respective workload and allocation period, the probability of each possible level of workload resource demand. Typically, each probability distribution is bell-shaped, tapering off either side of a peak indicating the resource level with the higher likelihood of being required to match the most likely demand level.

Probability distributions 19 can be obtained in many different ways. For example, the minimum and maximum demand of a workload can be tracked; a uniform probability distribution can be assumed between the minimum and the maximum. For a second example, the mean and variance/standard deviation of workload demand samples can be tracked; the empirically determined values can be used to specify a distribution function—e.g. normal distribution. For a third example, a histogram can be constructed from utilization data over time to define a probability distribution directly from frequency of occurrence data. The term "probability distribution" refers to an expression of probability as a function of demand level; a single prediction can be considered as a probability distribution with all of the "probability" in a narrow band around the single prediction.

The probability distributions 19 are input to allocation planner 15. Allocation planner 15 stores user-specified workload priorities 21 that can be used in the creation of workload utility functions 23. Each workload WL1-WL4 has a respective workload utility function 23.

For each workload WL1-WL4, the respective workload utility function 23 assigns a single number to every possible combination of resource allocation amount and resource demand level. Thus, the workload utility function can be expressed in three dimensions: the independent variables are the allocation amount and the demand level, and the dependent variable is the utility value. If higher values of the function are more desirable, then it is a standard utility function; if they are less desirable, the utility function may alternatively be referred to as a "penalty function". The workload utility function must be monotonic in both dimensions as additional resources are 1) worth less the more you have, and 2) worth more the more you need.

Workload utility functions 23 can use a common template, and then be differentiated by parameter values specified by workload priorities 21. Alternatively, different workload utility function templates can be used for different workloads. Finer control can be obtained by modifying individual utility values.

For example, utilization is a common workload operational parameter that may be specified as a target. Since utilization is the fraction of available resource consumed, a reasonable utilization target based penalty function would be one in which higher deviations from the target have higher penalties associated with them. By expressing a penalty function in terms of deviation above target utilization, all workloads could have the same penalty function. Alternatively, penalty functions could be adjusted for individual workloads to express differences in the value, e.g., business value, of deviations from the target or more generally differences in the business value of different workloads.

Allocation planner 15 includes an expected utility calculator 25 that calculates an expected utility 27 from workload utility function 23 and probability distribution 19 for each workload. The resulting expected utility function provides a utility value as a function of possible resource allocation level. The utility value is the probability-weighted sum of the utility values in the workload utility function. The expected utility function is monotonically increasing because more resources result in more utility. The expected value calculation is performed as follows.

If not already provided in this desired form, transform the probability distribution for each workload such that it expresses the probability that resource demand for the workload will fall into one of N demand ranges, where N is determined from the maximum resource available for the workload and the granularity with which the resource may be assigned.

For each workload, calculate the predicted value or penalty associated with each possible allocation of resource to the workload, by:

$$V_{wj} = \sum_{i=1}^{N} V_{wij} * P_{wi}$$

where w is an index over the workloads, i is an index over the possible resource demand levels, j is an index over the possible allocation levels, $V_{wj}$ is the expected utility of a jth amount of resources when allocated to the wth workload, $V_{wij}$ is workload utility function indicating the utility associated with an ith predicted demand and a jth resource allocation level for the wth workload, and $P_{wi}$ is the probability associated with an ith demand level for the wth workload. More precisely, $P_{wi}$ is the probability that (Di−(bin size)/2)<=actual demand<(Di+(bin size)/2), where Di is the ith possible demand level.

The result of this computation is an expected utility function $V_{wj}$ for the wth workload. For each workload, the expected utility function can be represented as a table giving the value of the possible resource allocations to the workload based upon the respective workload utility function $V_{wij}$ and the respective demand distribution $P_w$. If necessary, this table may be kept to a reasonable size by constraining the resource increment to be a given fraction of the total available resources. For example, if the resource were to be allocated in one tenth of one percent increments, the table size would be 1000 entries.

Allocation planner 15 includes a calculator 29 for calculating the expected marginal utility 31 ($\Delta V_{wj}$) of adding one unit of a resource to a workload as a function of the number of resource units already allocated to that resource unit. The expected utility function 31 gives utility values for each possible number j of units of a resource that might be allocated to a workload. The difference between the value for j units and j−1 units is the expected marginal utility of adding one resource unit in the case that j−1 units have already been allocated to the respective workload. The marginal utility function is generally monotonically decreasing as the first resources allocated have a bigger impact on utility than the resources that are allocated later.

Once the marginal utilities have been determined, a serial allocator 33 allocates resource units one at a time, each unit being allocated to the workload having the greatest expected marginal utility given the current resource allocations of the workloads. When a resource unit is allocated to a workload, the allocation level of that workload is incremented. Typically, the result is a lower marginal utility for that workload. As a result, when the next resource unit is to be allocated, another workload may (or may not) have the highest marginal utility. Once all the resource units have been allocated, the allocation plan may be implemented by allocation implementer 17 or used for other purposes.

Figure 2:
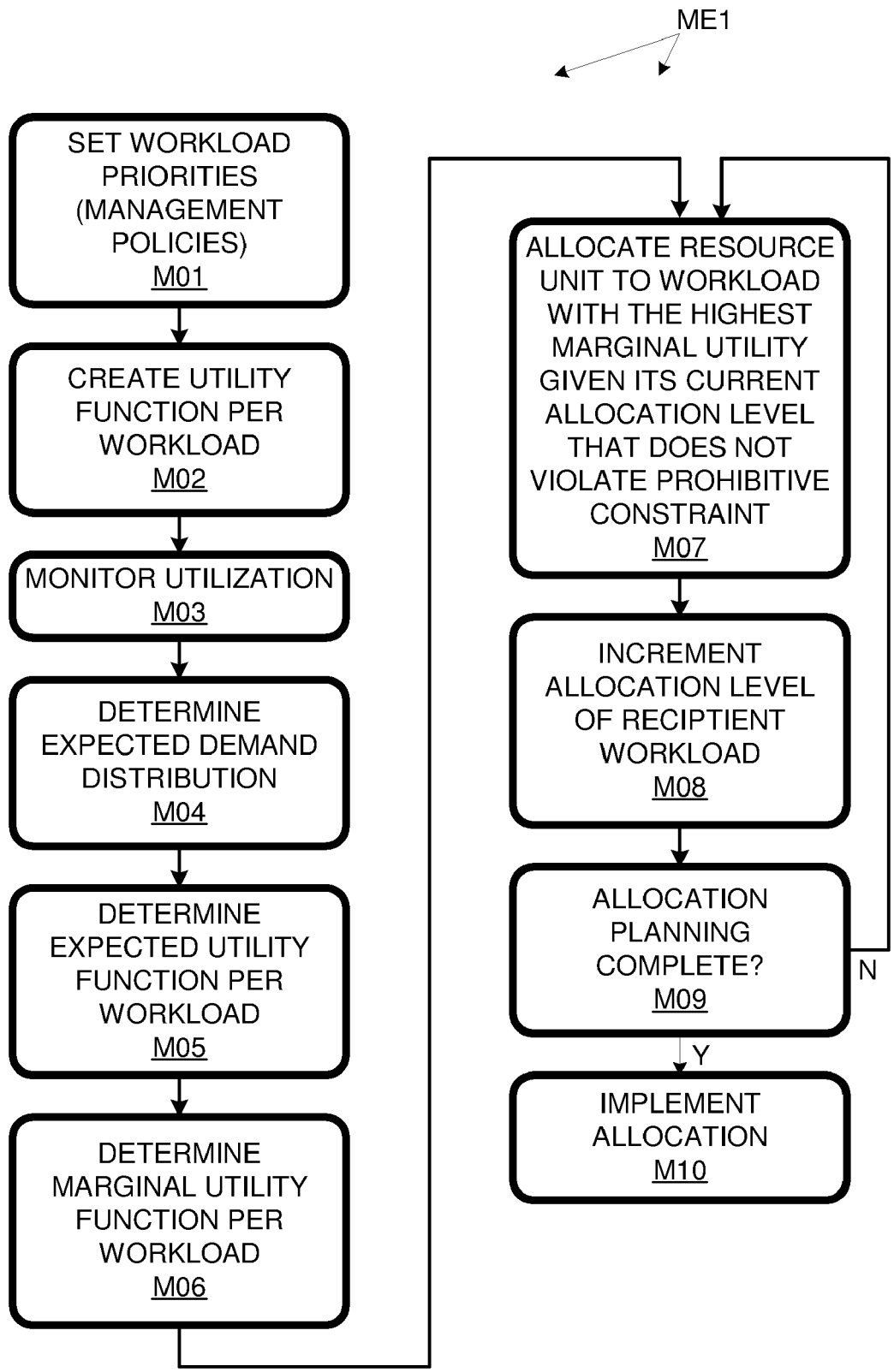
FIGS. 2-4 are flow charts of methods in accordance with embodiments of the present invention.

A method ME1 implemented in the context of server complex AP1 is flow-charted in FIG. 2. At method segment M01, workload priorities 21 are established, e.g., to fit the business needs of the workload owner or owners. In the present case, workload priorities are expressed as fractional "priority weightings" between zero and one, with higher values indicating higher priority. Method ME1 also provides for an integer priority value, in which case, the expected marginal utility value is only used to determined priorities among workloads having the same integer priority value.

Method segment M02 involves creating a workload utility function 23 for each workload. The workload utility function expresses the value of a given resource allocation for a given demand level. Initially, a common normative utility function can be used for all workloads. The workload utility function can be scaled by the workload priority weighting so that the values associated with lower-priority workloads are less than corresponding values for higher priority workloads. The user can make adjustments to individual utility values to fine tune utility functions. The invention does not require that different workloads have different utility functions and is still useful in the case that all workloads have a common utility function, since workloads can be expected to have differing predicted demand distributions which will result in differing allocations for them.

Method segment M03 involves monitoring utilization and other parameters to generate data to be used in predicting resource levels required to meet future demands on the workloads. Workload reallocation can take place periodically, e.g., every five seconds. During each allocation period, the utilization by each workload of resources subject to reallocation is monitored so that a utilization percentage or other value can be generated in time to be reflected in the allocation for the next allocation period. In addition to utilization, other parameters, such a request response time, and external parameters, such as market trends, can be tracked and the resulting data can be used along with utilization data in predicting demand levels.

Method segment M04 involves generating a demand-level probability distribution 19 in the upcoming allocation period given the data gathered through the present allocation period. Typically, probability distribution 19 has a peak corresponding to the most-likely utilization level for the upcoming allocation period. Probabilities for lesser and greater resource levels tend to decrease away from this peak.

Method segment M05 provides for determining an expected utility function 27 for each workload. This function expresses the value of allocating various possible amounts of resources to a workload given the probability distribution for resource demand. For each resource allocation level, the expected utility is the sum of products of the utility values from the workload utility function determined in method segment M02 and probabilities determined in method segment M04. In the sum, there is one term for each demand level represented in the workload utility function. Thus the expected utility of each possible resource allocation level is a weighted average of the utilities of that allocation level for the possible demand levels, where the weighting corresponds to the predicted probabilities of those demand levels.

Method segment M06 involves determining the expected marginal utility of adding a resource unit given an existing allocation level. Given a workload with j−1 resource units allocated, the marginal utility of adding another resource unit is the difference between the expected utility for j units less the expected utility for j−1 units. The marginal utility function is typically monotonically decreasing as the marginal utility of adding a unit of resource typically decreases as the amount allocated increases and the requirements for the workload are closer to being satisfied.

Method M07 involves serial allocation of resource units to workloads in an order determined by expected marginal utilities. Thus, the first unit of a resource is allocated to the workload having the highest marginal utility for adding a first resource unit. Each time a resource unit is allocated, of course, the allocation level for the recipient workload is incremented at method segment M08 so that the previously identified highest-priority value is not a involved in selecting a recipient for the next resource unit. Thus, each successive resource unit to be allocated faces a slightly modified set of marginal utilities as it tries to find its workload for the upcoming allocation period.

After each unit is allocated, a determination is made at method segment M09 whether or not there are any more resource units to be allocated. If not, allocation planning is done and the planning can be implemented at method segment M10. Otherwise, method ME1 returns to method segment M07 to allocate the next resource unit. Of course, method ME1 can be repeated for each resource type, e.g., processors, communications devices, memory, utility software, licenses, etc. While in some cases, each resource type is allocated independently of the others, the invention also provides for allocating one resource type as a function of an allocation of another resource type; for example, the workload utility function of the second resource type can itself be a function of the allocation of the first resource type.

Method ME1 provides for skipping at method segment M07 any allocations that would violate a prohibitive hierarchical constraint. For example, there can be constraints on the transfer of resources across certain container boundaries that can affect resource allocation. For example, some embodiments do not permit a processor to be transferred between hard partitions, while other embodiments do permit such transfers. Thus, at method segment M07, a workload might be allocated to a workload other than the workload with the highest marginal utility if the later allocation required a processor to be transferred in violation of a containment boundary constraint.

The present invention also provides for handling "granularity" constraints in which the minimum unit size for allocations to workloads is smaller than the minimum size for allocations to intermediate level containers. For example, in some cases it is possible to allocate fractions of a processor to a virtual partition, while hard partitions require whole number processor allocations. In such a case, allocation of a fraction of a processor to a workload, e.g., WL1, would require a whole processor to be allocated to a hard partition, e.g., NP1, containing that workload. The present invention provides alternative approaches to handling such granularity constraints.

Figure 3:
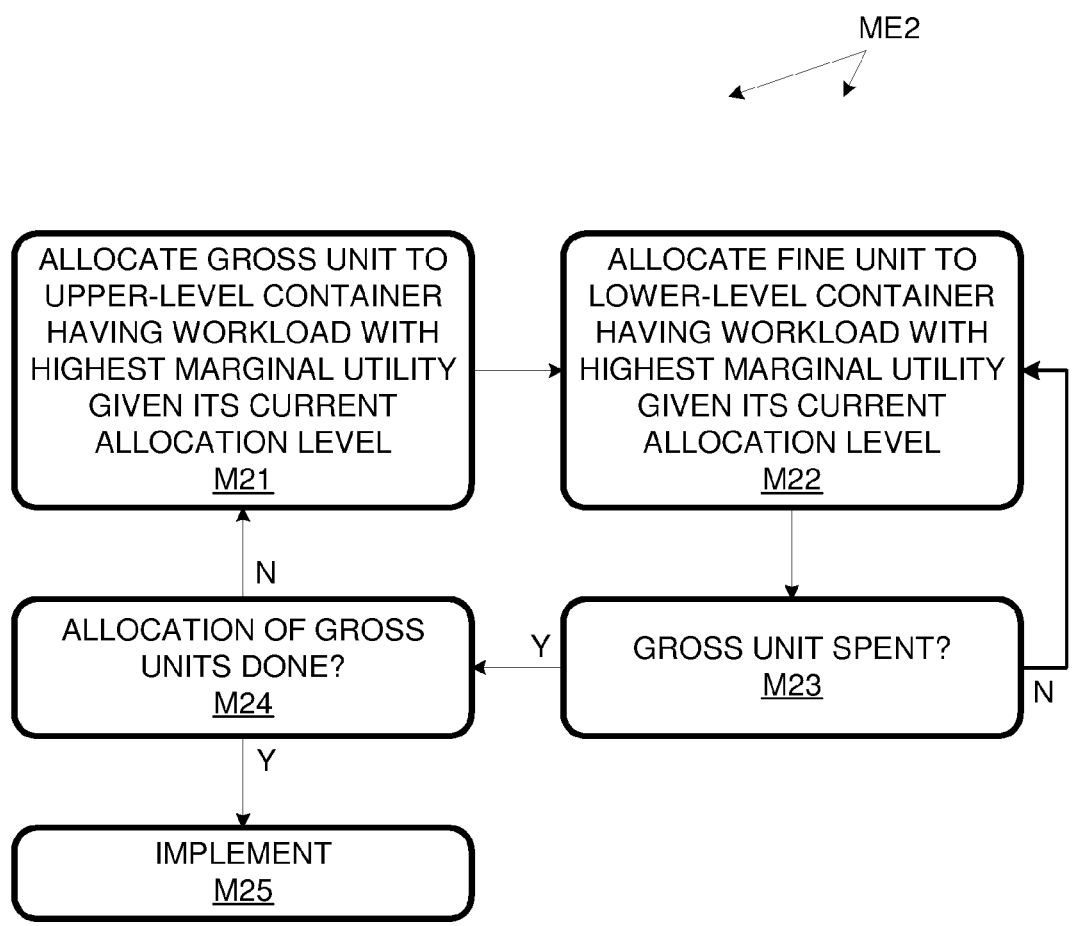
Figure 4:
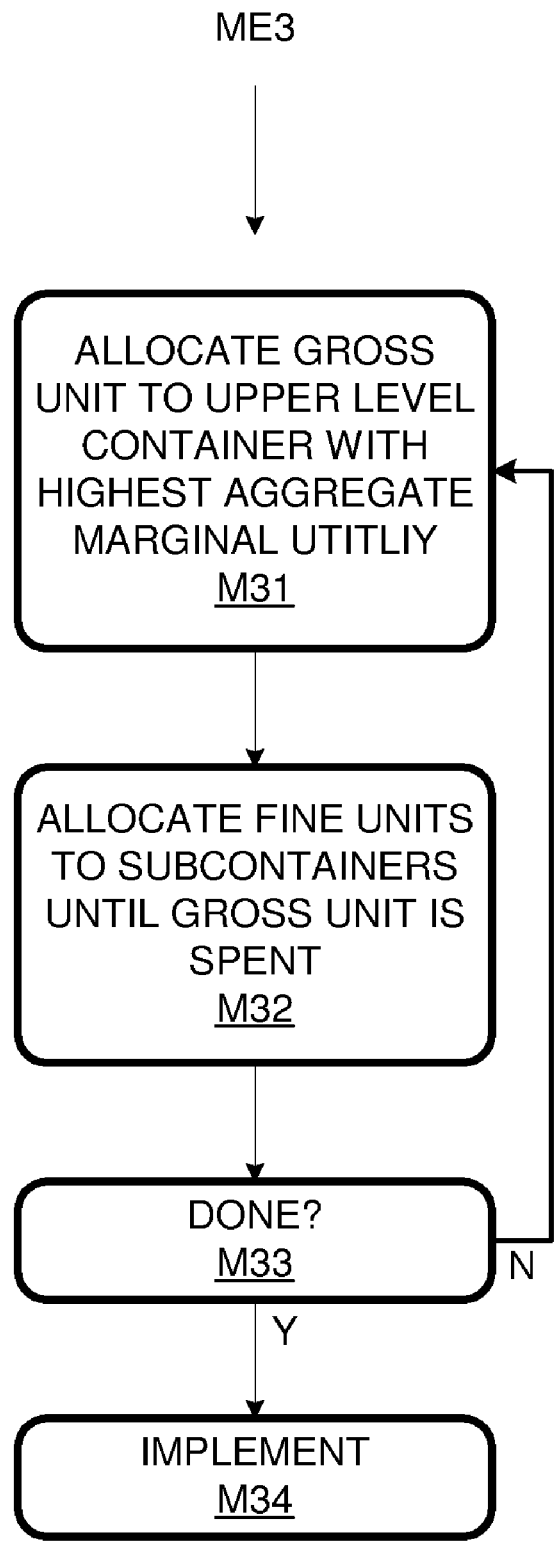

Method ME2, flow-charted in FIG. 3, attempts to allocate resources to workloads in the manner that method ME1 does, but acknowledges the granularity constraints. The current allocation for each workload determines the value of the next increment of resource for that workload. Instead of allocating that a resource unit directly to the workload, a unit of suitable granularity is allocated to the resource container sub-tree containing the workload with the highest expected marginal utility.

For example, the first "fine" unit to be allocated can be one-tenth of a processor to the workload, e.g., WL1, with the highest expected marginal utility for that unit. However, at method segment M21, instead of allocating that fine unit directly, a gross unit, e.g., a whole processor, is allocated to a container-hierarchy subtree represented by an intermediate-level container, e.g., a hard partition NP1, containing the selected workload. This gross unit is then allocated at method segment M22 among workloads within the intermediate level container, with workloads outside that container excluded from consideration. If there are more than two levels of containers with different granularities, method segment M21 is applied recursively until fine units are allocated to workloads at method segment M22.

Allocation of fine resource units continues until the allocated gross unit is spent, as determined at method segment M23. Once the allocated gross unit is spent, method segment ME2 checks to see if there are any more gross units to be allocated at method segment M24. If not, allocating planning is complete and the allocation can be implemented at method segment M25. Otherwise, method ME2 returns to method segment M21 to allocate the next gross unit to the workload with the highest aggregate unsatisfied marginal utility.

Method ME1 is intended to maximize the utility value of an allocation. Method ME2 can fall short of this objective as workloads with lower marginal utilities can receive allocations before workloads with higher marginal utilities. For example, a workload with a third highest marginal utility that resides in the same intermediate-level container as a workload with the highest marginal utility will receive a resource allocation before a workload with the second highest marginal utility not residing in that container. In other words, the highest-priority workload may only need a few smaller granules of the larger granule allocated to its parent, and its sibling workloads may only have low value requests. In such a case, workloads with lower marginal utilities can receive allocations before allocations with higher marginal utilities by virtue of there being in the same intermediate level container as the workload with the highest marginal utility.

Method ME3, flow charted in FIG. 3, comes closer to maximizing the utility value of an allocation in many cases. Method ME3 involves determining the aggregate marginal utility of allocating each gross unit to intermediate-level containers. This is an improvement over method ME2 since the allocation decision is based upon the overall value of the full resource increment at each level of the hierarchy, rather than on just the value of what may be a single small increment.

At method segment M31, a gross unit is allocated to the intermediate-level container with the highest maximum aggregate expected marginal utility. The workload having the highest expected marginal utility may or may not be in this container. The recipient intermediate-level container can be determined by provisionally allocating the gross unit to each possible recipient, and then serially distributing the gross unit in fine units to workloads in an order determined by their marginal utilities. The sum of the resulting expected marginal utilities for the workloads in each container is the expected aggregate marginal utility for the container.

If there are additional levels in the container hierarchy, the method can "trickle" down recursively to the workloads level-by-level. The container with the highest expected marginal utility for the gross unit being allocated becomes the actual recipient of that gross unit. Alternatively, method segment M31 can be implemented by assigning aggregate expected marginal utilities to each intermediate-level container and assigning gross units in the order determined by the aggregate expected marginal utilities.

At method segment M32, the just-allocated gross unit is distributed as fine units to workloads on the basis of their expected marginal utilities. This fine distribution can be determined after the gross unit allocation is made, or a provisional allocation used to identify the target for the gross unit can just be maintained as the actual allocation.

Once an allocated gross unit is spent in method segment M32, a determination is made whether or not there any more gross units to be distributed at method segment M33. If not, allocation planning is complete and the allocation can be implemented at method segment M34. Otherwise, method ME3 returns to method segment M31 for allocation of the next gross unit.

The use of predicted workload demand distributions provides more efficient resource allocation than allocation based upon a single-valued demand prediction, since all resources beyond policy-dictated amounts can be allocated in accordance with the predicted distributions. In particular, this means that resources that were previously considered excess can now be allocated to workloads that have the highest likelihood of needing them. By allocating resources to the workloads most likely to need them, the negative effects of inadequate resources are more likely to be avoided. Since resource allocation is more efficient, on average fewer resources should be required to for satisfactory operation of a given set of workloads. The reduced resource use can result in a lowered cost of operation.

A user can tailor the allocation process, e.g., to maximize business value, through selection of workload utility functions. However, users already familiar with workload managers that permit minima, maxima, and owned amounts to be specified, may be more comfortable retaining that framework. In such cases, the invention provides for the use of expected marginal utilities as: 1) an exclusive consideration in allocating resources, or 2) as a method to prioritize within some other system of setting priorities.

For example, one allocation scheme allocates resources generally in the following order beginning with the highest priority.

1) The minimum resource required for the resource container to which the workload is assigned.

2) The minimum resource requested by the user for the workload, i.e., the "policy" minimum resource that may be assigned to the workload's resource container.

3) The whole or part of the predicted resource demand for the workload that is less than or equal to a user-specified "owned" amount. This is called the "owned" request. An "owned" resource amount is an amount of resources that is reserved specifically for the workload's use if needed, but is available on a lower priority basis to other workloads when not needed by the owner.

4) The part of the predicted demand that is greater than the user-specified owned amount but not exceeding the user-specified maximum. This is called the "borrow" amount. This item only applies to workloads for which the predicted amount exceeds the owned amount.

5) The part of the owned amount that is greater than the predicted amount. This item only applies to workloads for which the owned amount is greater than the predicted amount.

6) The maximum resource requested by the user for the workload, i.e., the policy maximum.

7) The maximum resource that may be assigned to the workload's resource container.

Within such a scheme, the present invention might be used to set priorities within one or more of levels 1-7. For example, marginal utilities could be used to allocate borrowed amounts at level 4. The use of the marginal utilities could be further constrained to setting priorities within gross priorities set by management policies. These and other variations upon and modification to the illustrated embodiments are provided for by the present invention, the scope of which is defined by the following claims.

What is claimed is:
1. A system comprising:
computing resources for running computer workloads;
a workload manager for planning an allocation for each of
  a series of allocation periods of said resources to candidate recipient computer workloads at least in part as a function of expected marginal utilities of allocating resource units of said resources to said workloads, each of said expected marginal utilities corresponding to an expected change in utility resulting from allocating at least one of said resource units to a non-negative number of resource units already allocated to one of said workloads, said workload manager including, a workload monitor for generating utilization data indicating for at least some of said workloads the extent to which that workload utilizes resources assigned to it;

a prediction engine for providing probability distributions for expected demands by said workloads for said resources for future allocation periods;

a workload utility function for at least some of said workloads, each workload utility function specifying for its respective workloads a value of a utility parameter at least in part as a function of a demand level and an allocation level, said expected marginal utilities being determined at least in part from said workload utility functions and said probability distributions; and a container hierarchy of containers to which said resources can be assigned, said container hierarchy including a root container, intermediate-level containers, and base-level containers within each of which at most one of said workloads runs, said root container containing all other of said containers and said workloads, each of said intermediate-level containers including one or more of said base-level containers, said resources being allocable to at least some of said intermediate-level containers in gross units of said resources, said resources being allocable to said workloads and base-level containers in fine units of said resources, wherein each of said gross units corresponds to multiple fine units.

2. A system as recited in claim 1 wherein said gross units of said resource are allocated respectively to the intermediate-level containers containing the workloads with a highest marginal utility given their current allocation level.

3. A system as recited in claim 1 wherein said gross units of said resource are allocated respectively to the intermediate level containers so as to achieve a highest possible aggregate marginal utility for the receiving intermediate-level container.

4. A system comprising:

computing resources for running computer workloads; and a workload manager for planning an allocation for each of a series of allocation periods of said resources to candidate recipient computer workloads at least in part as a function of expected marginal utilities of allocating resource units of said resources to said workloads, each of said expected marginal utilities corresponding to an expected change in utility resulting from allocating at least one of said resource units to a non-negative number of resource units already allocated to one of said workloads, said workload manager being configured to allocate said resources to said workloads according to a series of priority levels of said workloads, the allocating being performed at least in part as a function of marginal utilities affecting allocations within said workloads having a same priority level and not between said workloads having different priority levels.

5. A method of allocating computing resources to computer workloads comprising:

selecting workload utility functions for said workloads, each utility function specifying a utility value at least in part as a function of a demand level and an allocation level;

monitoring utilization of said resources by said workloads to generate utilization data;

determining expected demand probability distributions for said workloads at least in part as a function of said utilization data;

determining said expected marginal utility functions for said workloads at least in part as functions of said distributions and said workload utility functions;

planning an allocation of resources to workloads at least in part as a function of expected marginal utilities of allocating resource units of a resource to said workloads, each of said expected marginal utilities corresponding to an expected change in utility resulting from allocating at least one of said resource units to a non-negative number of resource units already allocated to one of said workloads;

implementing said allocation; and wherein said workloads are assigned to base-level containers within a hierarchy of containers, said container hierarchy including a root container, intermediate-level containers, and said base-level containers, said root container containing all other of said containers and said workloads, each of said intermediate-level containers including one or more of said base-level containers, said resources being allocable to at least some of said intermediate-level containers in gross units of said resource, said resource being allocable to said workloads and base-level containers in fine units of said resources, wherein each of said gross units corresponds to multiple fine units.

6. A method as recited in claim 5 wherein said gross units of said resource are allocated respectively to the intermediate-level containers containing the workloads with a highest marginal utility given their current allocation level.

7. A method as recited in claim 5 wherein said gross units of said resource are allocated respective to the intermediate level containers so as to achieve a highest possible aggregate marginal utility for the receiving intermediate-level container.

8. A method of allocating computing resources to computer workloads comprising:

planning an allocation of resources to workloads at least in part as a function of expected marginal utilities of allocating resource units of a resource to said workloads, each of said expected marginal utilities corresponding to an expected change in utility resulting from allocating at least one of said resource units to a non-negative number of resource units already allocated to one of said workloads, wherein said planning involves allocating said resources to said workloads according to a series of priority levels of said workloads, said allocating being performed at least in part as a function of marginal utilities affecting allocations within said workloads having a same priority level and not between said workloads having different priority levels; and implementing said allocation.

9. A computer product comprising non-transitory computer-readable media encoded with a workload manager program of computer-executable instructions for allocating for each of a series of allocation periods said computing resources to candidate recipient computer workloads at least in part as a function of expected marginal utilities of allocating units of a resource to said workloads, each of said expected marginal utilities corresponding to an expected change in utility resulting from allocating at least one of said resource units to a non-negative number of resource units already allocated to one of said workloads wherein said program is configured to allocate said resource units to said workloads according to a series of priority levels of said workloads, said allocating being performed at least in part as a function of marginal utilities affecting allocations within said workloads having a same priority level and not between said workloads having different priority levels.

10. A computer product as recited in claim 9 wherein said program calculates said expected marginal utilities from probability distributions for demand levels and from workload utility functions of resource allocation levels and demand levels.

11. A computer product as recited in claim 10 wherein said program determines said marginal utility functions from expected utility functions calculated from said distributions and workload utility functions.

* * * * *